US007895822B2

(12) United States Patent
Hoffmann et al.

(10) Patent No.: US 7,895,822 B2
(45) Date of Patent: *Mar. 1, 2011

(54) SYSTEMS AND METHODS FOR POWER GENERATION WITH CARBON DIOXIDE ISOLATION

(75) Inventors: Stephanie Marie-Noelle Hoffmann, Munich (DE); Michael Bartlett, Bavaria (DE)

(73) Assignee: General Electric Company, Niskayuna, NY (US)

( * ) Notice: Subject to any disclaimer, the term of this patent is extended or adjusted under 35 U.S.C. 154(b) by 1149 days.

This patent is subject to a terminal disclaimer.

(21) Appl. No.: 11/557,254

(22) Filed: Nov. 7, 2006

(65) Prior Publication Data

US 2008/0104939 A1    May 8, 2008

(51) Int. Cl.
*F02C 7/08* (2006.01)
*F02G 1/00* (2006.01)
*F02G 3/00* (2006.01)

(52) U.S. Cl. .................. 60/39.5; 60/39.52; 60/791

(58) Field of Classification Search ............ 60/772, 60/39.52, 791, 39.17, 39.5
See application file for complete search history.

(56) References Cited

U.S. PATENT DOCUMENTS

| | | | | |
|---|---|---|---|---|
| 2,915,379 A | * | 12/1959 | Agarwal | 75/444 |
| 4,285,917 A | * | 8/1981 | Knight | 423/224 |
| 4,528,811 A | * | 7/1985 | Stahl | 60/784 |
| 4,843,517 A | | 6/1989 | Maruyama et al. | |
| 5,490,035 A | | 2/1996 | Yen et al. | |
| 5,724,805 A | * | 3/1998 | Golomb et al. | 60/783 |
| 5,832,712 A | | 11/1998 | Ronning et al. | |
| 6,184,324 B1 | | 2/2001 | Benz et al. | |
| 6,655,150 B1 | | 12/2003 | Asen et al. | |
| 6,832,485 B2 | * | 12/2004 | Sugarmen et al. | 60/780 |
| 6,910,335 B2 | * | 6/2005 | Viteri et al. | 60/786 |

(Continued)

FOREIGN PATENT DOCUMENTS

WO    2004072443 A1    8/2004

(Continued)

OTHER PUBLICATIONS

O. Bolland & S. Saether, "New Concepts for Natural Gas Fired Power Plants Which Simplify the Recovery of Carbon Dioxide"; Energy Convers. Mgmt vol. 33, No. 5-8, pp. 467-475, 1992.

(Continued)

*Primary Examiner*—William H Rodríguez
(74) *Attorney, Agent, or Firm*—Francis T. Coppa

(57) ABSTRACT

A power generation system includes at least one turbine system. The turbine system includes a compressor section comprising at least one stage, configured to supply a compressed oxidant and a combustion chamber configured to combust the compressed oxidant and a fuel stream comprising carbon-based fuels and to generate a hot flue gas. The turbine system further includes an expander section having an inlet for receiving the hot flue gas comprising at least two stages. The two stages include a high-pressure expander configured to generate an expanded exhaust gas rich in $CO_2$. The high-pressure expander fluidly coupled to a low-pressure expander configured to generate a final exhaust and electrical energy. A $CO_2$ separation system is fluidly coupled to the high-pressure expander for receiving the expanded exhaust gas from the high-pressure expander and providing a $CO_2$ lean gas that is then fed to the low-pressure expander.

20 Claims, 4 Drawing Sheets

U.S. PATENT DOCUMENTS

| | | | |
|---|---|---|---|
| 6,957,539 B2* | 10/2005 | Lebas et al. | 60/772 |
| 7,266,940 B2* | 9/2007 | Balan et al. | 60/39.181 |
| 2002/0043063 A1 | 4/2002 | Kataoka et al. | |
| 2004/0011057 A1 | 1/2004 | Huber | |
| 2004/0016237 A1 | 1/2004 | Marin et al. | |
| 2004/0134197 A1* | 7/2004 | Marin et al. | 60/774 |
| 2004/0170935 A1 | 9/2004 | Lebas et al. | |
| 2005/0028529 A1 | 2/2005 | Bartlett et al. | |
| 2005/0132713 A1 | 6/2005 | Neary | |
| 2006/0037337 A1 | 2/2006 | Lear, Jr. et al. | |
| 2006/0064985 A1* | 3/2006 | Buecker et al. | 60/772 |
| 2006/0112696 A1* | 6/2006 | Lynghjem et al. | 60/772 |
| 2007/0199300 A1* | 8/2007 | MacAdam et al. | 60/39.52 |
| 2008/0104938 A1* | 5/2008 | Finkenrath et al. | 60/39.5 |

OTHER PUBLICATIONS

Thormod Andersen, Hanne M. Kvamsdal and Olav Bolland, "Gas Turbine Combined Cycle With CO2-Capture Using Auto-Thermal Reforming of Natural Gas"; Proceedings of ASME TURBO EXPO 2000: Land, Sea, and Air; May 8-11, 2000, Munich, Germany; 2000-GT-162. pp. 1-8.

Olav Bollard, et al.; "Exergy Analysis of Gas-Turbine Combined Cycle With CO2 Capture Using Auto-Thermal Reforming of Natural Gas"; Available from http://www.tev.ntnu.no/GlobalWatch/co2/Bolland_Ertesvaag_Speich,%20AIM%20Liege.pdf; (pp. 6).

Hanne M. Kvamsdal, Ivar S. Ertesvag, Olav Bolland, & Tor Tolstad, "Exergy Analysis of Gas-Turbine Combined Cycle With CO2 Capture Using Pre-Combustion Decarbonization of Natural Gas"; Proceedings of ASME TURBO EXPO 2002: Land, Sea, and Air, Jun. 3-6, 2002, Amsterdam, The Netherlands; GT-2002-30411, pp. 1-8.

Olav Bolland, Henriette Undrum; "A Novel Methodology for Comparing CO2 Capture Options for Natural Gas-Fired Combined Cycle Plants"; Advances in Environmental Research 7 (2003) pp. 901-911.

Riti Singh, John Horlock & Tony Haslam; "Cycles for Low Carbon Dioxide Production"; Conference Report and Summary; (pp. 6).

* cited by examiner

SYSTEMS AND METHODS FOR POWER GENERATION WITH CARBON DIOXIDE ISOLATION

BACKGROUND

The invention relates generally to power generation and the efficient recovery of carbon dioxide. More particularly, the invention relates to the integration of pressurized flows from gas turbines with carbon dioxide separation and recovery.

Power generation systems that combust fuels containing carbon, for example, fossil fuels, produce carbon dioxide ($CO_2$) as a byproduct during combustion as carbon is converted to $CO_2$. Carbon dioxide ($CO_2$) emissions from power plants utilizing fossil fuels are increasingly penalized by national and international regulations, such as the Kyoto protocol, and the EU Emission Trading Scheme. With increasing cost of emitting $CO_2$, $CO_2$ emission reduction is important for economic power generation. Removal or recovery of the carbon dioxide ($CO_2$) from power generation systems, such as from the exhaust of a gas turbine, is generally not economical due to the low $CO_2$ content and low (ambient) pressure of the exhaust. Therefore, the exhaust containing the $CO_2$ is typically released to the atmosphere, and does not get sequestered into oceans, mines, oil wells, geological saline reservoirs, and so on.

Gas turbine plants operate on the Brayton cycle. They use a compressor to compress the inlet air upstream of a combustion chamber. Then the fuel is introduced and ignited to produce a high temperature, high-pressure gas that enters and expands through the turbine section. The turbine section powers both the generator and compressor. Combustion turbines are also able to burn a wide range of liquid and gaseous fuels from crude oil to natural gas.

There are three generally recognized ways currently employed for reducing $CO_2$ emissions from such power stations. The first method is to capture $CO_2$ on the output side, wherein the $CO_2$ produced during the combustion is removed from the exhaust gases by an absorption process, diaphragms, cryogenic processes or combinations thereof. A second method includes reducing the carbon content of the fuel. In this method, the fuel is first converted into $H_2$ and $CO_2$ prior to combustion. Thus, it becomes possible to capture the carbon content of the fuel before entry into the gas turbine. A third method includes an oxy-fuel process. In this method, pure oxygen is used as the oxidant as opposed to air, thereby resulting in a flue gas consisting of carbon dioxide and water.

The main disadvantage of the method to capture the $CO_2$ on the output side is that the $CO_2$ partial pressure is very low on account of the low $CO_2$ concentration in the flue gas (typically 3-4% by volume for natural gas applications) and therefore large and expensive devices are needed for removing the $CO_2$. Therefore there is a need for a technique that provides for economical recovery of $CO_2$ discharged from power generation systems (for example, gas turbines) that rely on carbon-containing fuels.

BRIEF DESCRIPTION

In one aspect, a power generation system includes at least one turbine system. The turbine system includes a compressor section comprising at least one stage, configured to supply a compressed oxidant and a combustion chamber, configured to combust the compressed oxidant and a fuel stream comprising carbon-based fuels and to generate a hot flue gas. The turbine system further includes an expander section having an inlet for receiving the hot flue gas, where the expander section comprises at least two stages. The two stages comprise a high pressure expander configured to generate an expanded exhaust gas rich in $CO_2$. The high pressure expander is fluidly coupled to a low pressure expander configured to generate a final exhaust and electrical energy. A $CO_2$ separation system is fluidly coupled to the high-pressure expander for receiving the expanded exhaust gas from the high pressure expander and provide a $CO_2$ lean gas that is then fed to the low-pressure expander.

In another aspect, a power generation system includes a first turbine system including a first compressor section comprising at least two stages. The two stages include a first low pressure compressor fluidly coupled to a first high pressure compressor configured to supply a first portion of compressed oxidant and a second portion of compressed oxidant. The first turbine system includes a first combustion chamber configured to combust the first portion of compressed oxidant and a first fuel stream comprising carbon-based fuels and to generate a first hot flue gas. The first turbine system further includes a first expander section having an inlet for receiving the first hot flue gas, where the first expander section comprises at least two stages. The two stages comprise a first high pressure expander configured to generate a first expanded exhaust gas rich in $CO_2$, the first high pressure expander fluidly coupled to a first low pressure expander configured to generate a first exhaust and electrical energy. A $CO_2$ separation system is fluidly coupled to the high pressure expander for receiving the first expanded exhaust gas from the first high pressure expander and provide a $CO_2$ lean gas that is then fed to the first low-pressure expander. The power generation system further includes a second turbine system. The second turbine system includes a second compressor section comprising at least two stages. The two stages include a second low pressure compressor fluidly coupled to a second high pressure compressor. A second combustion chamber is configured to combust the second portion of compressed oxidant and a second fuel stream comprising carbon-based fuels and, to generate a second hot flue gas. The second turbine system further includes a second expander section configured to receive the second hot flue gas comprising at least two stages. The two stages include a second high pressure expander configured to generate a second expanded exhaust gas. The second high pressure expander is fluidly coupled to a second low pressure expander configured to generate a second final exhaust and electrical energy. The second compressor section is configured to receive the second final exhaust comprising carbon dioxide and to discharge a recycle stream to the second combustion chamber and a split stream to the first combustion chamber.

In yet another aspect, a method for generating power includes compressing an oxidant in a compressor section to produce a compressed oxidant and combusting a first fuel and the compressed oxidant to produce a hot flue gas. The method further includes expanding the hot flue gas in an expander section to generate electrical energy. The expander section is configured to receive the hot flue gas, where the expander section comprises at least two stages, the at least two stages comprising a high pressure expander configured to generate a first expanded exhaust gas rich in $CO_2$, the high pressure expander fluidly coupled to a low pressure expander configured to generate a first exhaust and electrical energy. The method also includes separating $CO_2$ from the first expanded exhaust gas in a $CO_2$ separator and generating a $CO_2$ lean gas and introducing the $CO_2$ lean gas to the low pressure expander.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure provides a process for lowering $CO_2$ emissions by separation of $CO_2$ at high pressures in a power plant that utilizes gas turbines for power generation. $CO_2$ is removed from the exhaust gases from the $CO_2$-rich flue gas mid-way through the expansion pathway of a gas turbine. As the concentration and partial pressure of $CO_2$ is increased, a lower energy penalty is observed to remove the $CO_2$.

One embodiment of the present invention provides for two or more exemplary gas turbine systems operating in a power generation system to share a common supply of compressed oxidant. As a result, compression capacity can be freed in one or more of the turbine systems to be employed in the recovery of carbon dioxide ($CO_2$) generated by one or more of the turbine systems. In one example, a compressor in a first turbine system supplies oxidant (via conduits) to a combustion chamber in the first turbine system and also to a combustion chamber in a second turbine system, freeing a compressor in the second turbine system. As discussed below, this freed compression capacity can be employed to increase the concentration of $CO_2$ in the recycle stream in the second turbine system from the exhaust of one or more of the gas turbines. The recovered $CO_2$ may be sold as a product or consumed on-site as feed in other processes, for example. Further, such recovery of $CO_2$ reduces the amount of $CO_2$ emitted to the environment from the power generation system.

Figure 1:
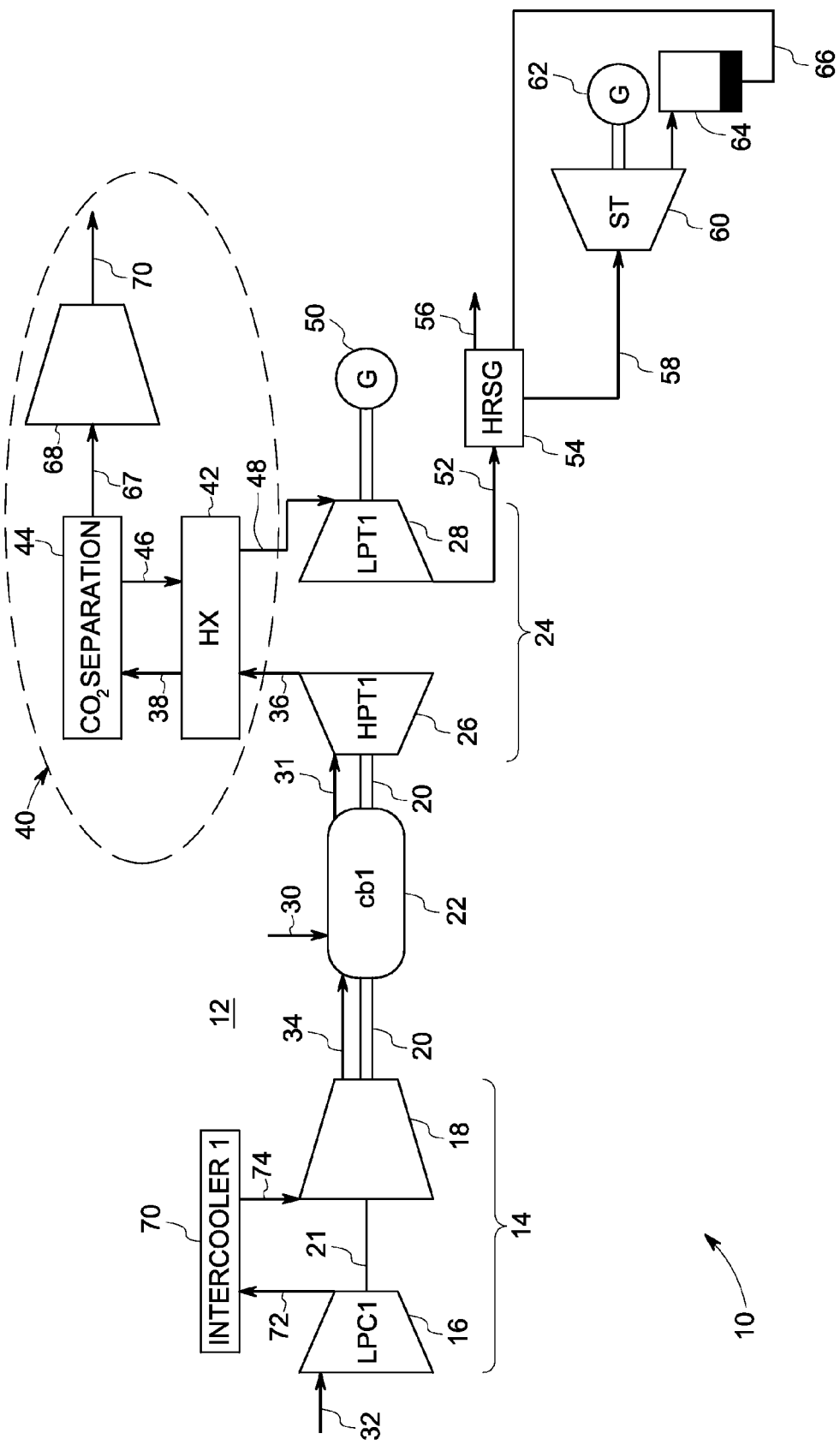
FIG. 1 is a schematic illustration of an exemplary power generation system with carbon dioxide separation system in accordance with certain embodiments of the present invention.
Figure 2:
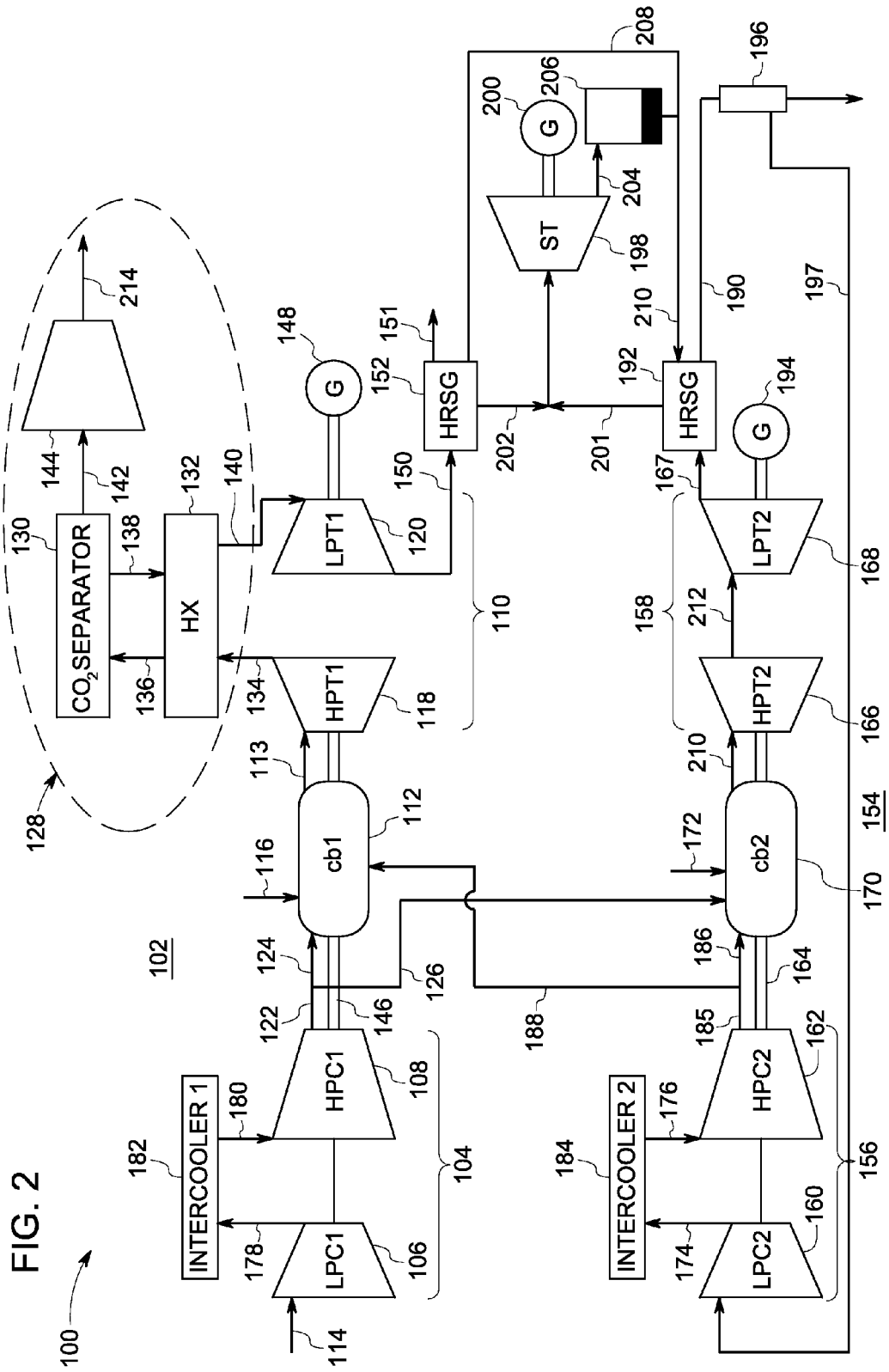
FIG. 2 is a schematic illustration of another exemplary power generation system comprising two turbine systems in accordance with certain embodiments of the present invention.
Figure 3:
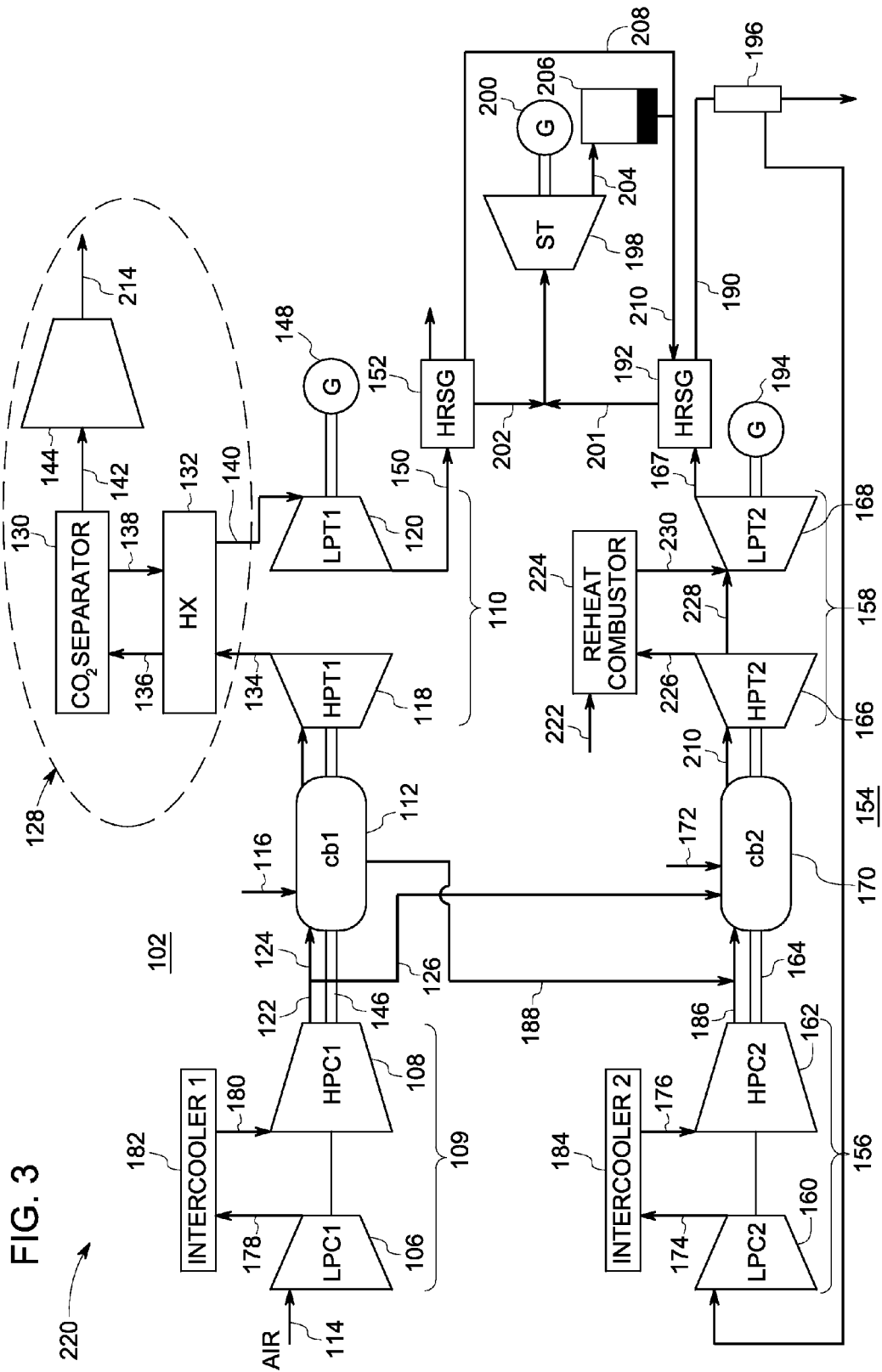
FIG. 3 is a schematic illustration of yet another power generation system comprising two turbine systems in accordance with certain embodiments of the present invention.

Referring now to FIG. 1, there is illustrated an exemplary power generation system 10 with a gas turbine system 12. The gas turbine system 12 generally includes a compressor section 14. In one embodiment, the compressor section 14 includes at least one stage. In some other embodiments, as shown in FIGS. 1-3 the compressor section 14 includes at least two compression stages and a combustion chamber 22. In one embodiment, the compressor section 14 comprises two stages, a low-pressure compressor 16 fluidly coupled to a high-pressure compressor 18 and is configured to supply compressed oxidant 34 to the combustion chamber 22. The power generation system also includes at least one expander section 24 for supplying the energy required for driving the compressors 16, 18 and a generator 50. The combustion chamber 22 is configured to combust a fuel stream 30 and the compressed oxidant 34 and to generate a hot flue gas 31.

As shown in FIG. 1, the expander section 24 typically comprises at least two stages and is configured to receive the hot flue gas 31. The two stages of the expander section 24 include a high-pressure expander 26 configured to generate an expanded exhaust gas 36 rich in $CO_2$. The high-pressure expander 26 is fluidly coupled to a low-pressure expander 28 configured to generate a final exhaust 52 and to drive the generator 50 and generate electricity.

The power generation system 10 further includes a $CO_2$ separation system 40 fluidly coupled to the high pressure expander 26 for receiving the expanded exhaust gas 36 from the high pressure expander 26 and for providing a $CO_2$ lean gas 48 to the low-pressure expander 28.

In the illustrated embodiment as shown in FIG. 1, the high-pressure compressor 18 and the low-pressure compressor 16 are driven through a common, or multiple shafts 20 and the low-pressure expander 28 is a separate power turbine driving the generator on a separate shaft. In operation, this driving arrangement provides flexibility in driving the compressors and the expanders at different speeds to achieve a higher compression ratio. Further such a gas turbine with a power turbine can be more easily modified for fluid extraction and reinjection.

The turbine system 12 includes a heat recovery steam generator (hereinafter HRSG) 54. The HRSG 54 is configured to use the heat content of the final exhaust 52 from the expander section 24 to generate steam 58 and a cooled final exhaust 56. The cooled final exhaust 56 released to the atmosphere is substantially free of $CO_2$ as the $CO_2$ separation system is configured to separate the $CO_2$ content of the hot flue gas 31 generated in the combustion chamber 22. The steam 58 generated in the HRSG 54 is subsequently used in a steam turbine 60 to generate electrical energy and expanded steam 61. The water separated from the expanded steam 61 is recycled back to the HRSG 54 to generate steam.

As shown in the embodiment of FIG. 1, the $CO_2$ separation system 40 includes a heat exchanger 42 and a $CO_2$ separator 44. The $CO_2$ separator 44 may apply various techniques known in the art, including but not limited to pressure swing adsorption, chemical absorption and membrane separation, and so forth. To separate the $CO_2$ from the first expanded exhaust stream 36, the first expanded exhaust 36 is introduced into the heat exchanger 42 to reduce the temperature and produce a cooled first expanded exhaust 38. The cooled first expanded exhaust 38 is introduced in the $CO_2$ separator 44 to generate a $CO_2$ rich stream 67 and a $CO_2$ lean stream 46. The $CO_2$ lean stream 46 further comprises CO, un-reacted fuel and $N_2$ if the oxidant used is air. The $CO_2$ lean stream 46 is introduced into the heat exchanger 42 to recover the heat content of or from the first expanded exhaust 36 and generates a heated $CO_2$ lean stream 48. The $CO_2$ lean stream 48 is introduced into the low-pressure expander 28 for further expansion and generation of electrical energy.

Pressure swing adsorption (PSA) may be used for separation of carbon dioxide from a mixture of gases. In PSA techniques, at a high partial pressure, solid molecular sieves can adsorb carbon dioxide more strongly than other gases. As a result, at elevated pressures, carbon dioxide is removed from the mixture of gases this mixture is passed through an adsorption bed. Regeneration of the bed is accomplished by depressurization and purging. Typically for critical operations, a plurality of adsorption vessels is used for continuous separation of carbon dioxide, wherein one adsorption bed is used while the others are regenerated.

Another technique for separation of carbon dioxide from a gas stream is chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes that are selective to $CO_2$. Typically membrane separators work more efficiently at higher pressures, and use of a membrane separator to separate the carbon dioxide from the cooled first exhaust stream 38 is facilitated by the elevated pressure at the outlet of the high pressure expander. The higher pressure available for the separation of $CO_2$ also reduces the size of the $CO_2$ separator 44, thereby enhancing the feasibility and the economics of the $CO_2$ separation process. The overall efficiency of power generation and the $CO_2$ separation is further enhanced while using high temperature membranes to separate $CO_2$. Advantageously, a high temperature membrane material may be used to allow separation at temperatures as close to the extraction temperature as possible. This decreases the size and cost of the heat exchanger 42.

Yet another technique used for separation of $CO_2$ from the first expanded exhaust 36 may include, but is not limited to, chemical absorption of $CO_2$ using amines. The expanded exhaust 36 may be cooled to a suitable temperature to use chemical absorption of carbon dioxide using amines. This technique is based on alkanol amines solvents that have the ability to absorb carbon dioxide at relatively low temperatures, and are easily regenerated by raising the temperature of the rich solvents. A carbon dioxide rich stream 67 is obtained after regeneration of the rich solvent. The solvents used in this technique may include, for example, triethanolamine, monoethanolamine, diethanolamine, diisopropanolamine, diglycolamine, and methyldiethanolamine. Another technique for separating $CO_2$ may be physical absorption. It may be noted that all or a combination of any of the techniques described above for $CO_2$ separation may be used to separate $CO_2$ advantageously.

The heat exchanger 42 in the $CO_2$ separation system 40 is typically a gas-gas heat exchanger handling two gaseous streams, namely the expanded exhaust stream 36 and the $CO_2$ lean stream 46. The volume of the expanded exhaust stream 36 is higher than the volume of the $CO_2$ lean stream 46 coming out of the $CO_2$ separator 44 as $CO_2$ is isolated from the expanded exhaust stream 36 in the $CO_2$ separator 44. Therefore the amount of heat released from the expanded exhaust stream 36 in the heat exchanger 42 may not be utilized fully in heating the $CO_2$ lean stream 46 and this excess heat may be utilized to regenerate the solvent in the $CO_2$ separator in case chemical adsorption process is used. In some embodiments, the $CO_2$ separation system may further include a water removal system to remove moisture from the expanded exhaust 36 thereby further reducing the volume of the $CO_2$ lean stream 46. Therefore by including the water removal unit, the excess heat available for solvent regeneration is increased. Due to this effective utilization of the excess heat from the heat exchanger 42, the overall efficiency of the power generation system 10 is increased. Additionally, the excess heat can be otherwise utilized to improve the overall efficiency of the power generation system 10.

In some embodiments, during operation, the oxidant 32 is compressed to about 2 to about 10 bars in the first low pressure compressor 16 and optionally cooled down in an first intercooler 70. The basic principle of intercooling includes partly compressing the gas and then cooling it before the final compression to the desired pressure is carried out, for example in compressor 18. In this way, the compression work is reduced and thus the power output of the cyclic process is increased. As the existing aeroderivative style gas turbines comprise intercoolers disposed in-between the compression stages, no further changes in the turbine design is required to incorporate the intercoolers into such systems.

The power generation system described in the previous sections advantageously uses the positioning of the $CO_2$ separation system to effectively separate $CO_2$ generated in the combustion process. As shown in FIG. 1, $CO_2$ is removed after combustion, or more specifically, from the flue gas extracted at a pressure mid-way through the gas turbine expander. It is advantageous to remove the $CO_2$ from a pressurized flue gas as the driving forces for separation increase and equipment size and cost decrease. However, the higher the extraction pressure of the flue gas, the higher is its extraction temperature. Due to material constraints, it is advantageous to design the $CO_2$ separation system 40 at a temperature of about 700 Deg. C. to about 1000 Deg. C. Although the pressure available in the hot flue gas stream 31 immediately after the combustion chamber 22 is higher than the pressure of the first expanded exhaust 36, the trade off for positioning the $CO_2$ separation system midway between the expansion path is the high temperature of about 1300 Deg C. of the hot flue gas 31. In aeroderivative style gas turbines, as shown in FIG. 1, multiple compression and expansion stages result in a high compression ratio. Therefore, since the pressure generated in the compressor section is substantially high, the pressure available in the midway between the expander section is sufficiently high to design a cost effective and efficient $CO_2$ separation system.

FIG. 2 illustrates an exemplary power generation system 100 including a first gas turbine system 102 and a second gas turbine system 154.

In an exemplary embodiment, the first turbine system 102 includes a first combustion chamber 112 configured to combust a first fuel stream 116, and a first compressor section 104 configured to supply a first portion of compressed oxidant 124 to the first combustion chamber 112. The first turbine system 102 also includes a first expander section 110 having an inlet for receiving the first hot flue gas 113, which first expander section 110 comprises at least two stages. As shown in FIG. 2, the first expander section 110 includes two stages comprising a first high pressure expander 118 configured to generate a first expanded exhaust gas 134 rich in $CO_2$. The first high-pressure expander 118 is fluidly coupled to a first low-pressure expander 120 that is configured to generate a first final exhaust 150 and electrical energy.

The power generation system 100 further includes a $CO_2$ separation system 128 fluidly coupled to the high pressure expander 118 for receiving the first expanded exhaust gas 134 from the high pressure expander 118 and for providing a $CO_2$ lean gas 140 to the low-pressure expander 120.

The exemplary power generation system 100 may also include a second gas turbine system 154 including a second compressor section 156. The second compressor section 156 can include two stages comprising a second low-pressure compressor 160 fluidly coupled to a second high-pressure compressor 162. The second turbine system 154 further includes a second combustion chamber 170 configured to combust a second portion of compressed oxidant 126 and a second fuel stream 172 comprising carbon-based fuels and generate a second hot flue gas 210. The second portion of compressed oxidant 126 is supplied by the first compressor section 104 of the first turbine system 102 thereby freeing up the compressor capacity of the second turbine system 154 for internal compression of recycle streams for increasing the $CO_2$ concentration. The second turbine system 154 further includes a second expander section 158 configured to receive the second hot flue gas 210. The second expander section 158 also comprises at least two stages, including a second high pressure expander 168 configured to generate a second expanded exhaust gas 212. The second high pressure expander 166 is fluidly coupled to a second low pressure expander 168 configured to generate a second final exhaust 167 and electrical energy through a generator 194 coupled to the second turbine system 154.

The second compressor section 156 is configured to receive the second final exhaust 167 comprising carbon dioxide and to discharge a recycle stream 186 to the second combustion chamber 170 and a split stream 188 to the first combustion chamber 112. The second combustion chamber 170 is configured to combust a second fuel stream 172, wherein the first compressor section 104 of the first gas turbine system 102 is configured to supply oxidant 126 (a second portion of the compressed oxidant 122) to the second combustion chamber 170.

In the illustrated embodiment, the first turbine system 102 also includes a first heat recovery steam generator (hereinafter HRSG) 152. Similarly the second turbine system 154 typically includes a second heat recovery steam generator (hereinafter HRSG) 192. The first final exhaust 150 from the first gas turbine system 102 may be fed into the first HRSG 152 for recovering the heat content of the first final exhaust 150. A water stream 208 can be introduced into the first HRSG 152, which in turn may generate a first portion of steam 202 at least in part by utilizing the heat recovered from the first final exhaust stream 150. The cooled first final exhaust 151 from the first HRSG 152 is vented into the atmosphere. The second final exhaust stream 167 generated in the second turbine system 154 can be introduced into the second HRSG 192. In this embodiment, the second HRSG 192 is generally a closed loop HRSG wherein no stream is typically vented into the atmosphere. The heat content of the second final exhaust stream 167 may be recovered by a water stream 210 to produce a second portion of steam 201. The first portion of steam 202 generated in the first HRSG 152 and the second portion of the steam 201 generated in the second HRSG 192 may be used in a steam turbine 198 to produce electrical energy through a generator 200, for example and an expanded steam 204. The water content in the expanded steam 204 is separated in a separator 206 and is recycled back to the first HRSG 152 and second HRSG 192 as 208 and 210.

In the various embodiments of the power generation systems described herein, the oxidant is ambient air. It is understood that the compressed oxidant 122 from the first compressor section 104 may comprise any other suitable gas containing oxygen, such as for example, oxygen rich air, oxygen depleted air, and/or pure oxygen.

The first and second fuel streams 116 and 172 may include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, and mixtures thereof, and so forth. In one embodiment, the fuel is primarily natural gas (NG) and, therefore, the first hot flue gas 113 from the first combustion chamber 112 and the second hot flue gas 210 from the second combustion chamber 170 may include water, carbon dioxide ($CO_2$), carbon monoxide (CO), nitrogen ($N_2$) if the oxidant is air, unburned fuel, and other compounds.

The cooled second final exhaust stream 190 from the second HRSG 192 is generally introduced into a gas cooler and moisture separator 196 to separate the water formed in the combustion process in the second combustion chamber 170. The exit stream 197 from the moisture separator 196 typically includes at least $CO_2$, CO, $N_2$ and unburned hydrocarbon along with any uncondensed $H_2O$. The exit stream 197 is generally compressed in the second compressor section 156 to generate a compressed stream 185. In operation, during the initial phase of operation after start-up, the concentration of $CO_2$ in the compressed stream 185 may not be substantial and hence the entire stream 185 may be recycled back to the second combustion chamber 170 as a recycle stream 186. This recycling operation generally increases the $CO_2$ concentration in the compressed stream 185. When the $CO_2$ concentration in the compressed stream 185 reaches a desired level, a split stream 188 may be introduced into the first combustion chamber 112. A control valve configuration (not shown) may be employed to facilitate diversion and introduction of the split stream 188 to the first combustion chamber 112. For example, a control valve may be disposed on the conduit carrying the split stream, and the operation of the control valve tied to an on-line instrument or sensor that measures the concentration of $CO_2$ in the compressed stream 185. The $CO_2$ concentration in the first hot flue gas 113 exiting the first combustion chamber 112 is therefore maximized by increasing the concentration of $CO_2$ in the second turbine system by controlling the recycles stream 186 and the split stream 188.

In this exemplary embodiment as depicted in FIG. 2, substantial carbon dioxide isolation is achieved. The first final exhaust 150, generated from the first combustion chamber 112 is substantially free from carbon dioxide and the cooled first final exhaust stream 151 vented to atmosphere typically does not release any carbon dioxide. The carbon dioxide produced in the second combustion chamber 170 may be concentrated in the recycle stream 186 and eventually fed into the first combustion chamber 112. The $CO_2$ content in the split stream 188 along with the $CO_2$ generated in the first combustion chamber 112 is separated in the $CO_2$ separation system 128 and the $CO_2$ stream 142 may be sequestrated or sold in the merchant market depending on the demand for carbon dioxide. The $CO_2$ rich stream 142 generated in the $CO_2$ separation system may be compressed in a compressor 144 before being distributed for other use.

In some embodiments, in operation, a mixture of air (or oxygen-enriched air) 114 is compressed to about 2 to about 10 bars in the first low pressure compressor 106 and optionally cooled down in a first intercooler 182 disposed between the fist low pressure compressor 106 and the first high pressure compressor 108. The basic principle of intercooling includes partly compressing the gas and then cooling it before the final compression to the desired pressure is carried out. In this way, the compression work is reduced and thus the power output of the cyclic process is increased. Similarly a second intercooler 184 is disposed between the second low-pressure compressor 160 and the second high-pressure compressor 162 to optionally cool down the compressed second final exhaust. As the existing aeroderivative style gas turbines comprises intercoolers disposed between the compression stages, no further changes in the turbine design is required to incorporate the intercoolers into such systems.

FIG. 3 illustrates yet another power generation system 220 wherein like features are designated with like numbers. In the exemplary power generation system 220, the second turbine system 154 further includes a reheat combustor 224, which reheat combustor 224 is disposed between the second high pressure expender 166 and the second low pressure expander 168. A portion of the second expanded exhaust 226 from the second high pressure expander 166 is introduced into the reheat combustor 224 configured to receive a third fuel 222. The outlet stream 230 comprising the combustion products is fed into the second low-pressure expander 168 to enhance the generation of electrical energy though the generator 194 coupled to the second turbine system 154. Reheat combustor 224 helps in increasing the power output possible for a given compression ratio. The temperature of the second hot flue gas 210 decreases after going through expansion in the second high-pressure expander 166. As the portion of the second expanded gas 226 is sent to the reheat combustor 224, the temperature of the outlet stream 230 from the reheat combustor 224 is increased due to the combustion process in the reheat combustor 224. The hot outlet stream 230 is introduced into the low pressure expander for further expansion to generate electrical energy and due to this temperature increase in the outlet stream 230, the overall power output is increases.

Figure 4:
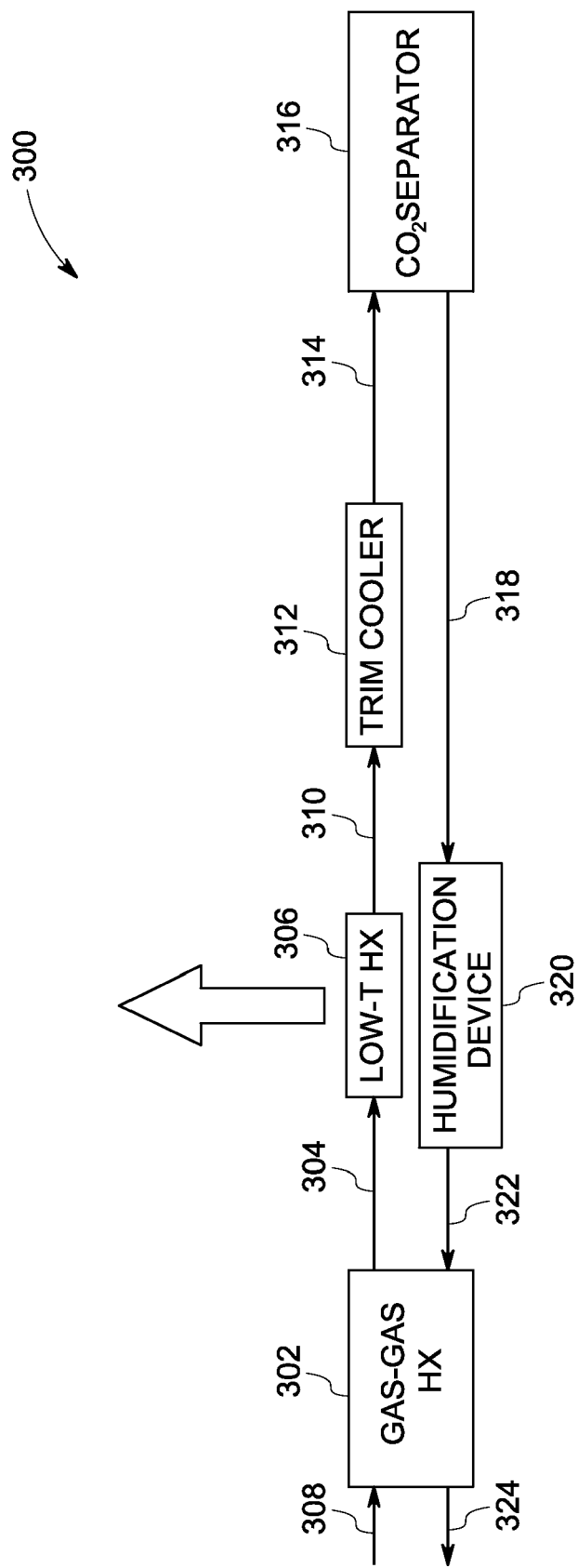
FIG. 4 is a schematic illustration of an exemplary heat exchanger system for $CO_2$ separation in accordance with embodiments of the present invention.

FIG. 4 illustrates an exemplary heat-exchanging unit 300 for the $CO_2$ separation system. In embodiments, wherein the expanded gas 308 from the high pressure expander (not shown in FIG. 4) needs to be cooled to the ambient temperature (for example, when an amine process is used to separate $CO_2$ from the exhaust streams), the cooled first expanded exhaust 304 from the heat exchanger 302 is introduced to a low temperature heat exchanger 306, which low temperature heat exchanger 306 further cools down the cooled first expanded exhaust stream leaving the heat exchanger 302. The low temperature heat exchanger 306 is coupled with a humidification device 320, which humidification device 320 is a source of moisture to be mixed with the $CO_2$ lean stream 318 discharged by the $CO_2$ separator 318. The heat exchanging system 300 may further comprise a trim cooler 312 disposed between the low temperature heat exchanger 306 and the $CO_2$ separator 316 to enhance the cooling efficiency of the first expanded exhaust stream 308.

There are several advantages of the power generation cycles described in the previous sections. The $CO_2$ separation system is advantageously disposed in between the low and high-pressure expanders. The first expanded exhaust from the high pressure expander is at a temperature of about 700 Deg C. to about 1000 Deg C., but still at a pressure, which pressure is sufficient to provide a high separation efficiency of $CO_2$ in the $CO_2$ separator in case a membrane separator or a PSA is used. The size and the capital cost for installing the $CO_2$ separation system is also reduced as the first expanded exhaust is at a high pressure of at about 2 bar to about 30 bar and a moderate temperature of about 700 Deg C. to about 1000 Deg C. The power generation system described herein is configured to achieve substantial isolation of $CO_2$ as the entire $CO_2$ generated from the combustion chambers is introduced into the $CO_2$ separation system. In the embodiments, wherein two turbine systems are included, the combustion products from the second turbine system is recycled in a closed loop as described above to build the optimum concentration level of $CO_2$ before being introduced to the first combustion chamber. So the exhaust that is released to the atmosphere from such power generation system is substantially free of $CO_2$.

Typically the power generation cycles that integrate $CO_2$ separation and isolation show a substantial decrease (in the range of about 10%) in the overall cycle efficiency compared to a power cycle without $CO_2$ separation. But the power generation systems described above show a much smaller decrease in the over all cycle efficiency due to the following reasons. The positioning of the $CO_2$ separation system midway through the expansion section thereby increasing the separation efficiency of $CO_2$ by utilizing a substantial high pressure even at the exit of the high-pressure expander helps increasing the overall efficiency of the power cycle. Furthermore the use of a reheat combustor and utilizing the excess heat generated in the gas-gas exchanger in the $CO_2$ separation system further increases the efficiency of the cycle. Therefore the overall energy penalty associated with power generation systems with $CO_2$ separation described above is far less than the conventional power cycles with $CO_2$ capture.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
    at least one turbine system comprising:
       a compressor section comprising at least one stage, and configured to supply a compressed oxidant;
       a combustion chamber configured to combust said compressed oxidant and a fuel stream comprising carbon-based fuels and to generate a hot flue gas;
       an expander section having an inlet for receiving said hot flue gas, said expander section comprising at least two stages, said at least two stages comprising a high pressure expander configured to generate an expanded exhaust gas rich in $CO_2$, said high pressure expander fluidly coupled to a low pressure expander configured to generate a final exhaust and electrical energy; and
    a $CO_2$ separation system directly coupled to said high pressure expander for receiving the expanded exhaust gas from said high pressure expander and providing a $CO_2$ lean gas, that is then fed to said low pressure expander.

2. The system of claim 1, wherein said compressor section comprises at least two stages, said at least two stages comprising a low pressure compressor fluidly coupled to a high pressure compressor.

3. The system of claim 1, wherein said $CO_2$ separation system comprises a heat exchanger configured to recover heat from said expanded exhaust gas and generate a cooled expanded exhaust gas and a carbon dioxide separator configured to receive said cooled expanded exhaust gas and generate a carbon dioxide lean stream.

4. The system of claim 3, wherein said heat exchanger comprises a cross-exchanger configured to recover heat from said expanded exhaust gas in exchange with said carbon dioxide lean stream from said carbon dioxide separator.

5. The system of claim 3, wherein the carbon dioxide separator comprises a membrane unit.

6. The system of claim 1, further comprising a heat recovery steam generator configured to recover heat from the final exhaust and generate steam.

7. The system of claim 5, further comprising a steam turbine configured to use said steam to generate electrical energy.

8. The system of claim 2, further comprising an intercooler disposed between said low pressure compressor and high pressure compressor.

9. The system of claim 1, wherein said final exhaust is substantially free of $CO_2$.

10. The system of claim 1, wherein said carbon-based fuels comprise natural gas.

11. The system of claim 1, wherein said oxidant is air.

12. A power generation system comprising:
a first turbine system comprising:
  a first compressor section comprising at least two stages, said at least two stages comprising a first low pressure compressor fluidly coupled to a first high pressure compressor configured to supply a first portion of compressed oxidant and a second portion of compressed oxidant;
  a first combustion chamber configured to combust said first portion of compressed oxidant and a first fuel stream comprising carbon-based fuels and to generate a first hot flue gas;
  a first expander section having an inlet for receiving said first hot flue gas, said first expander section comprising at least two stages, said at least two stages comprising a first high pressure expander configured to generate a first expanded exhaust gas rich in $CO_2$, said first high pressure expander fluidly coupled to a first low pressure expander configured to generate a first exhaust and electrical energy;
  a $CO_2$ separation system directly coupled to the high pressure expander for receiving said first expanded exhaust gas from said first high pressure expander and providing a $CO_2$ lean gas that is then fed to said first low pressure expander;
a second turbine system comprising:
  a second compressor section comprising at least two stages, said at least two stages comprising a second low pressure compressor fluidly coupled to a second high pressure compressor;
  a second combustion chamber configured to combust said second portion of compressed oxidant and a second fuel stream comprising carbon-based fuels and to generate a second hot flue gas; and
  a second expander section configured to receive said second hot flue gas, said second expander section comprising at least two stages, said at least two stages comprising a second high pressure expander configured to generate a second expanded exhaust gas, said second high pressure expander fluidly coupled to a second low pressure expander configured to generate a second final exhaust and electrical energy,
wherein said second compressor section is configured to receive said second final exhaust comprising carbon dioxide and to discharge a recycle stream to said second combustion chamber and a split stream to said first combustion chamber.

13. The system of claim 12, wherein said carbon-based fuels comprise natural gas.

14. The system of claim 12, further comprising a first heat recovery steam generator configured to recover heat from said first final exhaust and generate a first portion of steam and a second heat recovery steam generator configured to recover heat from said second final exhaust and generate a second portion of steam.

15. The system of claim 14, further comprising a steam turbine configured to use said first portion of steam and said second portion of steam to generate electrical energy.

16. The system of claim 12, further comprising a first intercooler disposed between said first low pressure compressor and first high pressure compressor and a second intercooler disposed between said second low pressure compressor and said second high pressure compressor.

17. The system in claim 12, further comprising a reheat combustor disposed between said second high pressure expander and said second low pressure expander.

18. The system of claim 12, wherein said first final exhaust is substantially free of $CO_2$.

19. The system of claim 12, wherein said oxidant is air.

20. A method for generating power comprising:
compressing an oxidant in a compressor section to produce a compressed oxidant;
combusting a first fuel and said compressed oxidant to produce a hot flue gas;
expanding said hot flue gas in an expander section to generate electrical energy wherein said expander section is configured to receive said hot flue gas, wherein said expander section comprises at least two stages, the at least two stages comprising a high pressure expander configured to generate a first expanded exhaust gas rich in $CO_2$, said high pressure expander fluidly coupled to a low pressure expander configured to generate a first exhaust and electrical energy;
separating $CO_2$ from said first expanded exhaust gas in a $CO_2$ separation system to generate a $CO_2$ lean gas, wherein the $CO_2$ separation system is directly coupled to the high pressure expander; and
introducing said $CO_2$ lean gas to said low pressure expander.

* * * * *